United States Patent
Smith et al.

(10) Patent No.: US 10,592,541 B2
(45) Date of Patent: Mar. 17, 2020

(54) TECHNOLOGIES FOR DYNAMIC AUTOMATED CONTENT DISCOVERY

(71) Applicant: Intel Corporation, Santa Clara, CA (US)

(72) Inventors: Elliot Smith, Birmingham (GB); Max Waterman, Essex (GB); Plamena Manolova, Northampton (GB); Karolina Kret, London (GB); Mikael Metthey, London (GB); Alok Barsode, London (GB)

(73) Assignee: Intel Corporation, Santa Clara, CA (US)

( * ) Notice: Subject to any disclaimer, the term of this patent is extended or adjusted under 35 U.S.C. 154(b) by 1063 days.

(21) Appl. No.: 14/725,290

(22) Filed: May 29, 2015

(65) Prior Publication Data

US 2016/0350404 A1   Dec. 1, 2016

(51) Int. Cl.
   *G06F 16/33*   (2019.01)
   *G06F 16/84*   (2019.01)
   *G06F 16/338*   (2019.01)

(52) U.S. Cl.
   CPC .......... *G06F 16/334* (2019.01); *G06F 16/338* (2019.01); *G06F 16/84* (2019.01)

(58) Field of Classification Search
   CPC ......... G06F 17/30675; G06F 17/30696; G06F 17/30914; G06F 16/334; G06F 16/84; G06F 16/338
   USPC .................................................. 707/723, 731
   See application file for complete search history.

(56) References Cited

U.S. PATENT DOCUMENTS

| | | | | |
|---|---|---|---|---|
| 7,873,640 B2 * | 1/2011 | Chang | ................. | G06F 17/2785 707/739 |
| 8,478,756 B2 * | 7/2013 | Heix | ..................... | G06F 16/951 707/736 |
| 9,904,681 B2 * | 2/2018 | Nitz | ..................... | G06F 17/2785 |
| 10,175,844 B2 * | 1/2019 | Pionkowski | ............ | G06F 16/26 |

(Continued)

OTHER PUBLICATIONS

International Search Report for PCT/US16/030053, dated Jul. 26, 2016 (3 pages).

(Continued)

*Primary Examiner* — James Trujillo
*Assistant Examiner* — Fariborz Khoshnoodi
(74) *Attorney, Agent, or Firm* — Barnes & Thornburg LLP

(57) ABSTRACT

Technologies for dynamic automated content discovery include a computing device that determines a contextual part of a document selected by a user and extracts one or more key terms from the contextual part of the document using an automated key phrase extraction algorithm. The computing device may perform a syntactic algorithm, named entity recognition, or the TextRank algorithm. The computing device may calculate a vagueness score for terms of the document by querying a semantic database and select the key terms based on the corresponding vagueness scores. The computing device performs a content search based on the key terms to generate one or more search results and presents the search results to the user. The computing device may associate each of the search results with the corresponding key term of the contextual part of the document, for example by visually highlighting the key term. Other embodiments are described and claimed.

9 Claims, 5 Drawing Sheets

(56) References Cited

U.S. PATENT DOCUMENTS

| | | | |
|---|---|---|---|
| 2010/0185689 A1* | 7/2010 | Hu | G06F 17/2775 707/803 |
| 2011/0179026 A1 | 7/2011 | Mulligen | |
| 2013/0124964 A1* | 5/2013 | Viegas | G06F 17/278 715/230 |
| 2013/0311505 A1 | 11/2013 | McCallum | |
| 2014/0229467 A1 | 8/2014 | Roseman et al. | |
| 2014/0280050 A1 | 9/2014 | Hadatsuki et al. | |
| 2015/0134652 A1* | 5/2015 | Lee | G06F 16/951 707/730 |
| 2015/0149429 A1* | 5/2015 | Chilakamarri | G06F 9/453 707/706 |
| 2015/0277715 A1* | 10/2015 | Wang | G06F 3/04845 345/661 |
| 2015/0356174 A1* | 12/2015 | Narayana | G06F 16/35 707/738 |

OTHER PUBLICATIONS

Written Opinion for PCT/US16/030053, dated Jul. 26, 2016 (8 pages).

Extended European Search Report for European application No. 16803916.2, dated Oct. 9, 2018 (9 pages).

* cited by examiner

PREFIX rdfs: <http://www.w3.org/2000/01/rd-schema#>
PREFIX dbpedia-owl: <http://dbpedia.org/ontology/>

ASK {
 ?thing rdfs:label ?label .
 ?thing dbpedia-owl:wikiPageID ?id .
 FILTER (
  ?label = "Battle of Hastings"@en'
 ) .
}

TECHNOLOGIES FOR DYNAMIC AUTOMATED CONTENT DISCOVERY

BACKGROUND

Content discovery is a common user task for many computing devices. For example, when a user is performing research or drafting a document, the user may wish to reference relevant information from external web sites or other content sources. In typical systems, the user manually provides one or more search terms to a search engine and then evaluates the search result. Typically, the user also must manually synchronize or otherwise associate search results with the relevant document content. Additionally, many word processing systems do not include a search feature, and thus the user typically uses an external application such as a web browser.

Key phrase extraction is a process used to reduce a text to short phrases, sentences, or other sequences of words which represent the most important parts of that text. Typical key phrase extraction algorithms syntactically analyze the text to produce a list of key phrases. For example, key phrase extraction algorithms may tokenize the input text, assign parts of speech to the tokens, and combine the tokens into key phrases using the assigned part-of-speech tags. A named entity recognition (NER) algorithm may assign additional weight to candidate key phrases that match entries in a dictionary of known noun phrases. The TextRank algorithm constructs and analyzes a graph based on the input text to extract key phrases.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
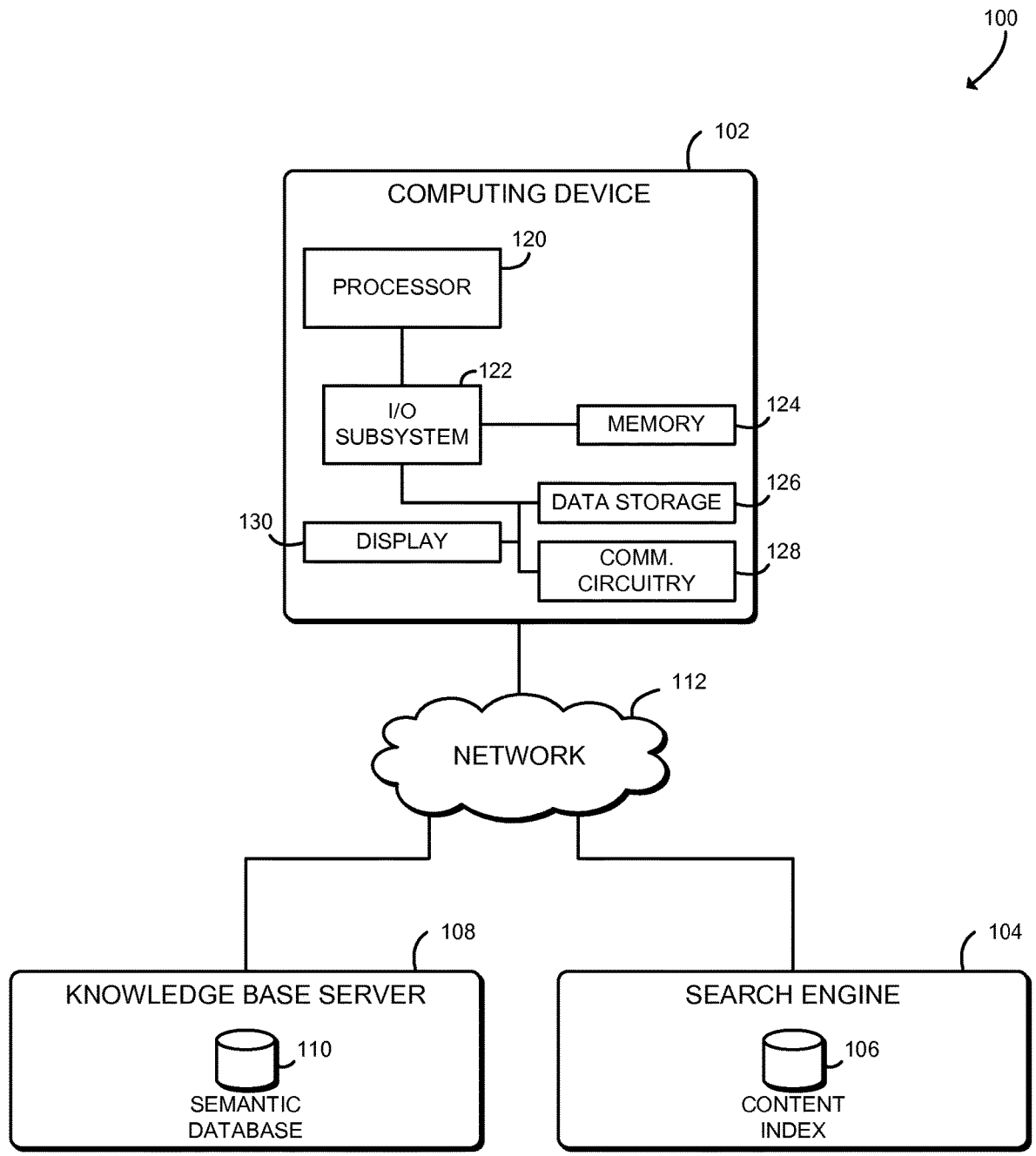
FIG. 1 is a simplified block diagram of at least one embodiment of a system for dynamic automated content discovery.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for dynamic automated content discovery includes a computing device 102, a search engine 104, and a knowledge base server 108 in communication over a network 112. In use, as described in more detail below, the computing device 102 displays a document selected by a user, for example within a web browser, a word processor, or other productivity application. The computing device 102 identifies a contextual part of the document based on the context of the user and extracts one or more key terms from the contextual part of the document. The computing device 102 may extract the key terms using a vagueness score calculated by querying a semantic database 110 that may be maintained by the knowledge base server 108. The computing device 102 performs one or more content searches using the key terms, for example by submitting the key terms to the search engine 104. The computing device 102 presents the search results to the user and may interactively associate each search result with the corresponding key term in the document (e.g., using visual highlighting). Thus, the system 100 provides automated content searches that adjust dynamically to the current context of the user. Accordingly, the user may be provided with contextually relevant search results automatically, without interrupting the user's primary interactions with the document, and those search results may update dynamically with changes to the document content. Additionally, by extracting key terms using a vagueness score, which is based on automated reasoning over a semantic database, the system 100 may provide better, more relevant results than by extracting key terms using syntactic key phrase extraction algorithms or dictionary lookups alone.

The computing device 102 may be embodied as any type of computation or computer device capable of performing the functions described herein, including, without limitation, a computer, a desktop computer, a workstation, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively includes a processor 120, an input/output subsystem 122, a memory 124, a data storage device 126, and communication circuitry 128. Of course, the computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processors 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store one or more documents or other user-accessible content. Additionally, in some embodiments the data storage device 126 may store other data such as content data, a content index, and/or semantic data that may be used for automatic content discovery.

The communication circuitry 128 of the computing device 102 may be embodied as any communication circuit, device, or collection thereof, capable of enabling communications between the computing device 102, the search engine 104, the knowledge base server 108, and/or other remote devices over the network 112. The communication circuitry 128 may be configured to use any one or more communication technology (e.g., wired or wireless communications) and associated protocols (e.g., Ethernet, Bluetooth®, Wi-Fi®, WiMAX, etc.) to effect such communication.

Additionally, the computing device 102 may also include a display 130. The display 130 may be embodied as any type of display capable of displaying digital information such as a liquid crystal display (LCD), a light emitting diode (LED), a plasma display, a cathode ray tube (CRT), or other type of display device. As described below, the display 130 may be used to display a graphical user interface or other information to the user of the computing device 102.

The search engine 104 is configured to search a body of content and return a set of search results. For example, in some embodiments the search engine 104 may be embodied as a web search engine, a file search engine, a specialized domain search engine, or any other search engine. The search engine 104 may store, maintain, or otherwise access a content index 106 to provide search results. The search engine 104 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. Thus, the search engine 104 includes components and devices commonly found in a server or similar computing device, such as a processor, an I/O subsystem, a memory, a data storage device, and/or communication circuitry. Those individual components of the search engine 104 may be similar to the corresponding components of the computing device 102, the description of which is applicable to the corresponding components of the search engine 104 and is not repeated herein so as not to obscure the present disclosure. Additionally, in some embodiments, the search engine 104 may be embodied as a "virtual server" formed from multiple computing devices distributed across the network 112 and operating in a public or private cloud. Accordingly, although the search engine 104 is illustrated in FIG. 1 as embodied as a single server computing device, it should be appreciated that the search engine 104 may be embodied as multiple devices cooperating together to facilitate the functionality described below.

The knowledge base server 108 is configured to allow clients to query a semantic database 110. The semantic database 110 maintains an ontology or other structured representation of a particular domain of knowledge. For example, in some embodiments the semantic database 110 may be embodied as an ontological representation of a general-knowledge encyclopedia, such as DBpedia. Of course, in some embodiments the semantic database 110 may be specialized or otherwise configured for a particular domain of knowledge. The knowledge base server 108 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. Thus, the knowledge base server 108 includes components and devices commonly found in a server or similar computing device, such as a processor, an I/O subsystem, a memory, a data storage device, and/or communication circuitry. Those individual components of the knowledge base server 108 may be similar to the corresponding components of the computing device 102, the description of which is applicable to the corresponding components of the knowledge base server 108 and is not repeated herein so as not to obscure the present disclosure. Additionally, in some embodiments, the knowledge base server 108 may be embodied as a "virtual server" formed from multiple computing devices distributed across the network 112 and operating in a public or private cloud. Accordingly, although the knowledge base server 108 is illustrated in FIG. 1 as embodied as a single server computing device, it should be appreciated that the knowledge base server 108 may be embodied as multiple devices cooperating together to facilitate the functionality described below.

As discussed in more detail below, the computing device 102, the search engine 104, and the knowledge base server 108 may be configured to transmit and receive data with each other and/or other devices of the system 100 over the network 112. The network 112 may be embodied as any number of various wired and/or wireless networks. For example, the network 112 may be embodied as, or otherwise include, a wired or wireless local area network (LAN), a wired or wireless wide area network (WAN), a cellular network, and/or a publicly-accessible, global network such as the Internet. As such, the network 112 may include any number of additional devices, such as additional computers, routers, and switches, to facilitate communications among the devices of the system 100.

Additionally, although the system 100 is illustrated as including a computing device 102, a search engine 104, and a knowledge base server 108, it should be understood that some or all of the functions of those devices may be combined into a single device. For example, a single server device may maintain both the content index 106 and the semantic database 110. Additionally or alternatively, in some embodiments the computing device 102 may maintain the content index 106 and/or the semantic database 110 locally.

Figure 2:
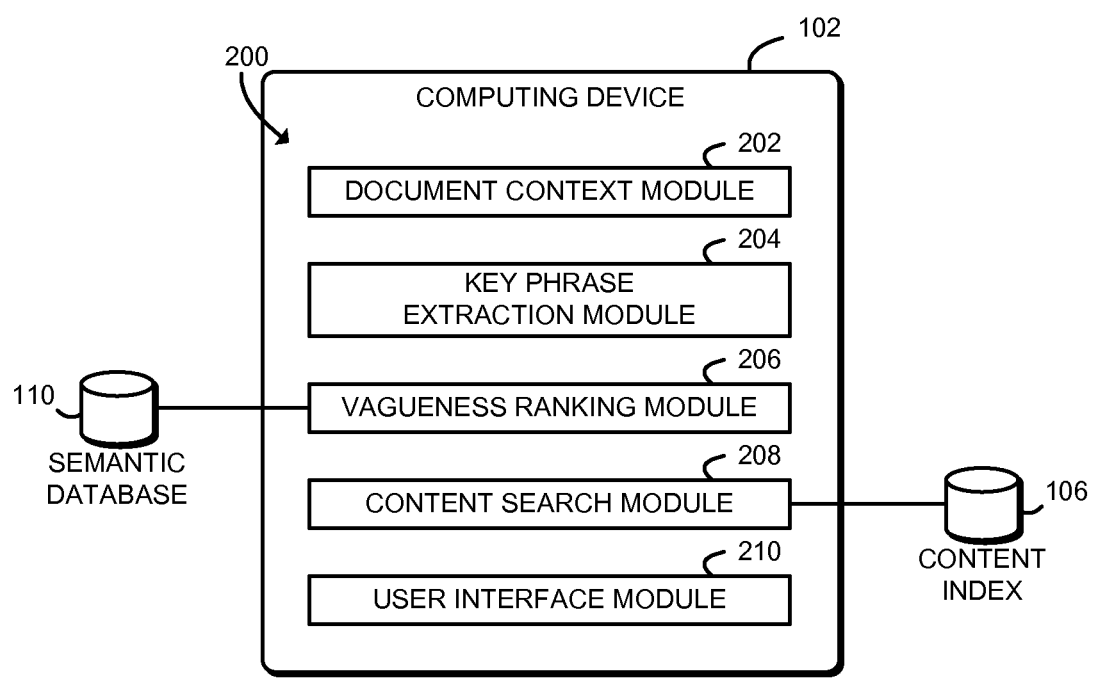
FIG. 2 is a simplified block diagram of at least one embodiment of an environment that may be established by a computing device of FIG. 1.

Referring now to FIG. 2, in an illustrative embodiment, the computing device 102 establishes an environment 200 during operation. The illustrative environment 200 includes a document context module 202, a key phrase extraction module 204, a vagueness ranking module 206, a content search module 208, and a user interface module 210. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 102. As such, in some embodiments, any one or more of the modules of the environment 200 may be embodied as a circuit or collection of electrical devices (e.g., a document context circuit, a key phrase extraction circuit, etc.).

The document context module 202 is configured to determine a contextual part of a document based on the context of the current user. For example, the document context module 202 may be configured to identify a part of the document that is visible in an application viewport of the computing device 102, or a part of the document that has been recently accessed by the user. The document includes textual information and is selected by the user, for example using a web browser, word processor, or other productivity application.

The key phrase extraction module 204 is configured to extract one or more key terms from the document or the contextual part of the document using an automated key phrase extraction algorithm. The key phrase extraction algorithm assigns importance values to terms of the document. An importance value provides a relative indication of how well each term of the document represents the content of the document or is otherwise considered important to the topic, meaning, or other content of the document. Each key term may be embodied as a word or phrase selected from the document contents. The key phrase extraction algorithm may be embodied as a syntactic text analysis algorithm, the TextRank algorithm, or a named entity recognition algorithm. The key phrase extraction module 204 may be configured to rank the terms of the document using the automated key phrase extraction algorithm to generate a ranked list of terms.

The vagueness ranking module 206 is configured to calculate a vagueness score for each term of the ranked list of terms by querying the semantic database 110. The vagueness score for each term is indicative of how frequently the candidate key term occurs in relation to classes and objects in a knowledge base. To determine the vagueness score, the vagueness ranking module 206 may be configured to submit a query to the knowledge base server 108. The vagueness ranking module 206 is further configured to re-rank the ranked list of terms based on the corresponding vagueness score of each term of the ranked list of terms to generate an adjusted ranked list of terms. The vagueness ranking module 206 is further configured to select the key term from the adjusted ranked list of terms. For example, the query of the semantic database 110 may determine whether any concept of the semantic database 110 includes a particular term. As another example, the query of the semantic database 110 may determine a corresponding number of concepts or types of concepts of the semantic database 110 that include each term of the ranked list of terms.

The content search module 208 is configured to perform an automated content search based on the extracted key terms to generate one or more corresponding search results. The content search module 208 may search using the content index 106, for example by submitting a search request to the search engine 104. The user interface module 210 is configured to present the one or more search results to the user, for example by displaying the search results in a graphical user interface on the display 130. The user interface module 210 may be further configured to associate each of the one or more search results with a corresponding key term of the contextual part of the document. For example, the user interface module 210 may be configured to visually highlight the corresponding key term of the contextual part of the document in response to a user selection of the corresponding search result.

Figure 3:
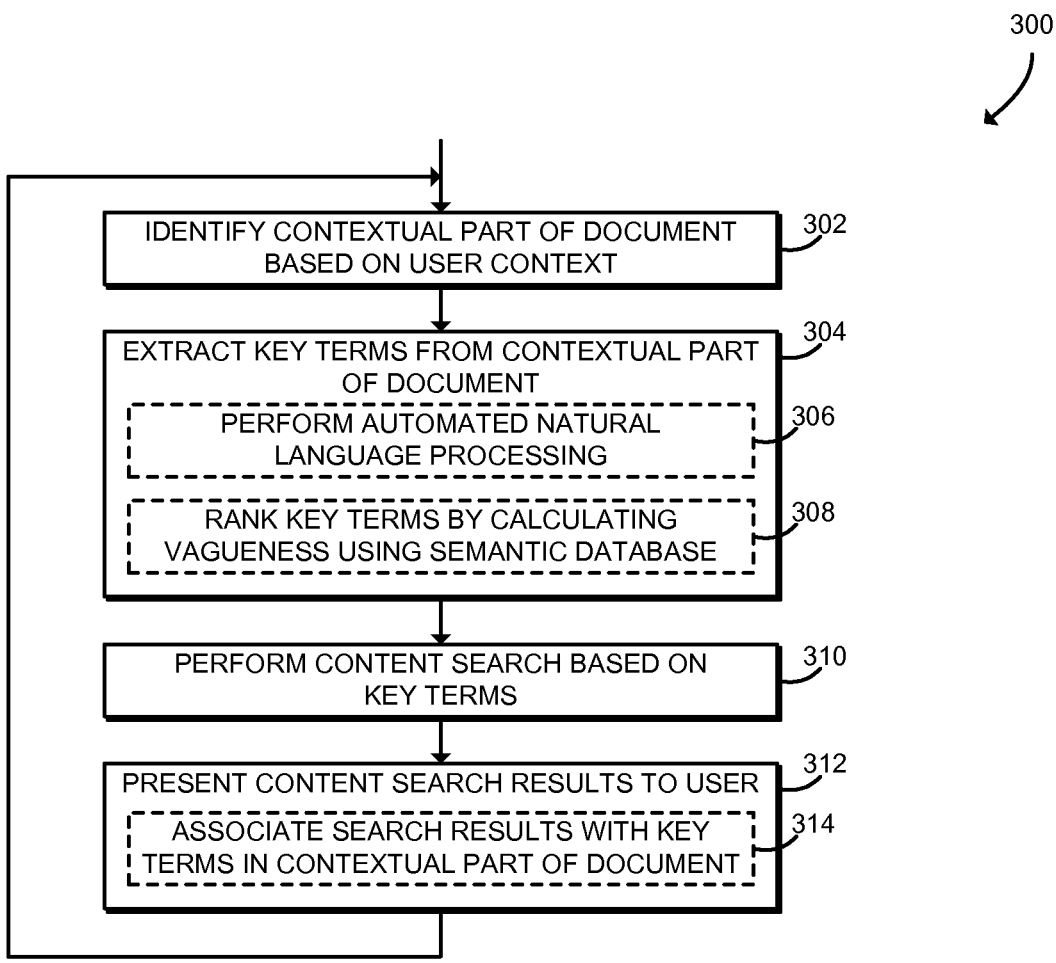
FIG. 3 is a simplified flow diagram of at least one embodiment of a method for dynamic automated content discovery that may be executed by the computing device of FIGS. 1 and 2.

Referring now to FIG. 3, in use, the computing device 102 may execute a method 300 for dynamic automated content discovery. The method 300 begins with block 302, in which the computing device 102 identifies a contextual part of a document based on the context of the user. The document may be embodied as any web page, text file, office productivity document, or other document that includes textual content. The contextual part of the document may be embodied as any part or sub-part of the document that is currently being viewed, edited, or otherwise accessible by the user. For example, the contextual part of the document may be embodied as a part of the document that is currently visible in an application viewport or other scrollable view established by the computing device 102. As another example, the contextual part of the document may be embodied as a part of the document recently accessed by the user, such as the last 20 seconds of audio read to the user using a speech reader or other assistive technology. In some embodiments, the contextual part of the document may include the entire document; in other words, in some embodiments the method 300 may analyze an entire document.

In block 304, the computing device 102 extracts one or more key terms from the contextual part of the document. The key terms include words and/or phrases extracted from the document that represent the content of the document or are otherwise considered important to the topic, meaning, or other content of the document. In some embodiments, the key terms may be noun phrases, that is, sequences of words that include a noun and other words related to the noun such as articles, prepositions, adjectives, and other modifiers. The computing device 102 may use any appropriate key phrase extraction algorithm or combination of algorithms to extract the key terms. The computing device 102 may extract any number of key terms; however, in some embodiments the number of key terms extracted may be proportional to the length of the contextual part of the document. In some embodiments, in block 306, the computing device 102 performs an automated natural language processing (NLP) algorithm to extract the key terms. For example, the computing device 102 may perform a syntactic algorithm, the TextRank algorithm, a named entity recognition (NER) algorithm, or another NLP algorithm. The computing device 102 may rank the terms of the document according to importance values determined by the NLP algorithm. As described above, the importance values provide a relative indication of how well each term of the document represents the content of the document or is otherwise considered important to the topic, meaning, or other content of the document. In some embodiments, in block 308 the computing device 102 may rank the key terms by calculating a vagueness measure for each key term using the semantic database 110. Terms having a higher vagueness measure (i.e., terms that are more vague) may be ranked lower than terms having a lower vagueness measure (i.e., terms that are less vague). One embodiment of a method for extracting key terms including calculating the vagueness measure is described further below in connection with FIG. 5.

In block 310, the computing device 102 performs one or more content searches based on the extracted key terms. For example, the computing device 102 may perform a single search for all of the key terms, perform a separate search for each of the key terms, or perform any other appropriate search strategy. To perform the search, the computing device 102 may submit the key terms to the search engine 104 or otherwise query the content index 106. In response to performing the search, the computing device 102 receives one or more search results, which may be embodied as text, graphics, or other content including or describing the results of the content search.

In block 312, the computing device 102 presents the content search results to the user. The computing device 102 may present the results using any appropriate technique. For example, the computing device 102 may present the search results visually in a sidebar next to the contextual part of the document, in a results window, or in another graphical user interface element. As another example, the computing device 102 may present the search results as audio using a speech reader or using any other user interface mode. In some embodiments, in block 314, the computing device 102 may associate one or more of the search results with the corresponding key terms in the contextual part of the document. For example, when the user selects a search result (e.g., by clicking on the search result, tapping on the search result, hovering with a pointer over the search result, or performing another selection action) the computing device 102 may visually highlight, underline, or otherwise emphasize the corresponding key term in the contextual part of the document content. After presenting the search results to the user, the method 300 loops back to block 302 to continue identifying the contextual part of the document and thus dynamically updating the search results.

Figure 4:
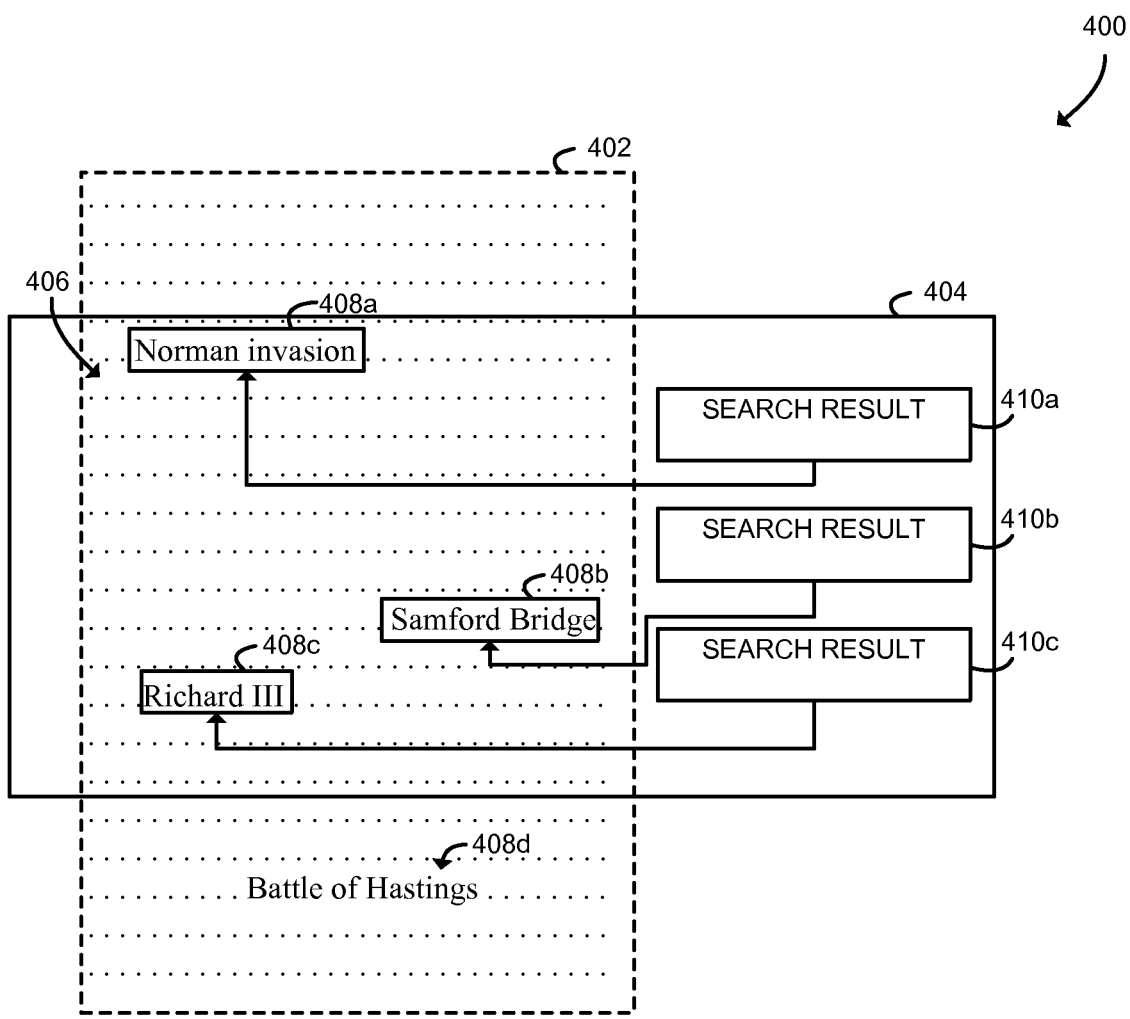
FIG. 4 is a schematic diagram illustrating a user interface that may be established by the computing device of FIGS. 1 and 2.

Referring now to FIG. 4, a schematic diagram 400 illustrates one potential embodiment of a user interface presented by the computing device 102 during execution of the method 300. The diagram 400 shows a document 402, which is illustratively a web page. The diagram 400 also shows an application viewport 404, which is illustratively a content window of a web browser. The contents of the application viewport 404 may be rendered on the display 130 of the computing device 102. A contextual part 406 of the document 402 corresponds to the part of the document 402 visible through the application viewport 404. Thus, the contents of the contextual part 406 change as the user scrolls through the document 402.

The illustrative document 402 is a web page on English history, and includes several key terms 408. As shown, the key terms 408a, 408b, 408c are included in the contextual part 406, and the key term 408d is not included in the contextual part 406 (i.e., the key term 408d is not visible in the application viewport 404). As shown, the application viewport 404 also includes search results 410 that correspond to the key terms 408 within the contextual part 406. For example, the search result 410a corresponds to the key term 408a ("Norman invasion"), the search result 410b corresponds to the key term 408b ("Samford bridge"), and the search result 410c corresponds to the key term 408c ("Richard III"). In the illustrative diagram 400, the relationships between the search results 410 and the corresponding key terms 408 are depicted visually using arrows and bounding boxes. In some embodiments, the visual indications of the relationships between the search results 410 and the corresponding key terms 408 may be hidden until the user selects a particular search result 410. For example, in response to a user selection of the search result 410a, the computing device 102 may render the visual indication highlighting the key term 408a. Additionally, as shown, there is no search result 410 displayed for the key term 408d, because the key term 408d is outside of the contextual part 406. As the user scrolls through the document 402, the key term 408d may become included in the contextual part 406 and the search results 410 may be updated accordingly.

Figures 5, 6:
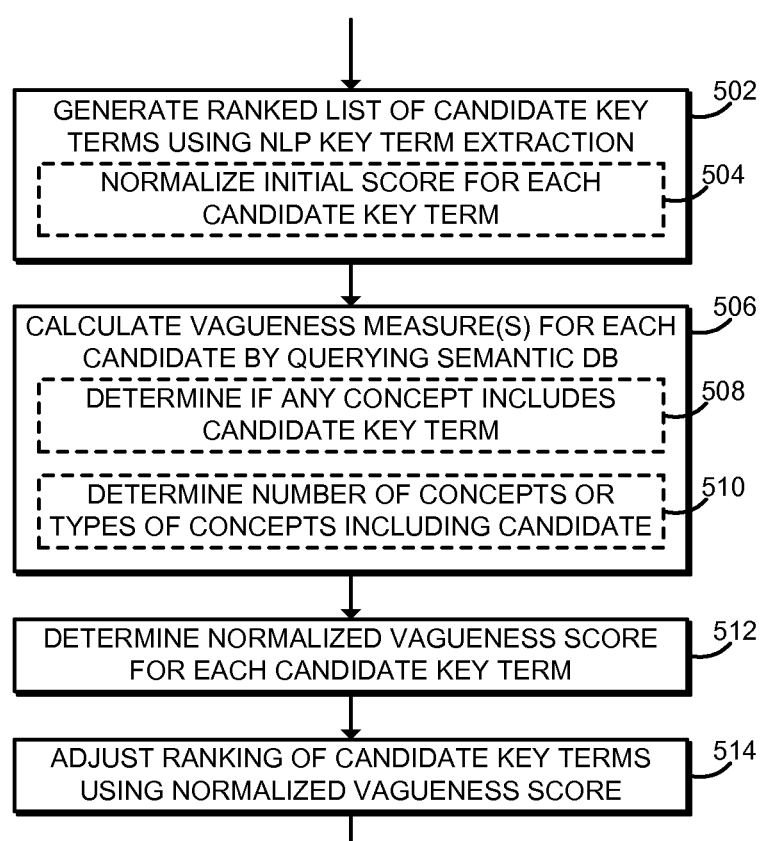
FIG. 5 is a simplified flow diagram of at least one embodiment of a method for key term extraction that may be executed by the computing device of FIGS. 1 and 2.
FIG. 6 is pseudocode illustrating a semantic database query that may be executed by the computing device of FIGS. 1 and 2.

Referring now to FIG. 5, in use, the computing device 102 may execute a method 500 for key term extraction. The method 500 may be executed, for example, as part of the method 300 as described above in connection with block 304 of FIG. 3. Additionally or alternatively, the method 500 may be executed independently to extract key terms from a document. The method 500 begins in block 502, in which the computing device 102 generates a ranked list of candidate key terms from a document using a natural language processing key phrase extraction algorithm. As describe above in connection with FIG. 3, the document may be embodied as a document or a part of a document that is currently being edited, viewed, or otherwise accessed by a user. The computing device 102 may use any appropriate key phrase extraction algorithm to generate the ranked list of candidate key terms. For example, the computing device 102 may perform a syntactic algorithm, the TextRank algorithm, a named entity recognition (NER) algorithm, or another NLP algorithm. The computing device 102 may rank the terms of the document according to importance values or other scores determined by the NLP algorithm. As described above, the importance values provide a relative indication of how well each term of the document represents the content of the document or is otherwise considered important to the topic, meaning, or other content of the document. In some embodiments, in block 504 the computing device 102 may normalize the initial score for each candidate key term. For example, each initial score may be normalized as a number between zero and one.

In block 506, the computing device 102 calculates one or more vagueness measures for each candidate key term by querying the semantic database 110. The vagueness measure may be embodied as any measure indicating how frequently the candidate key term occurs in relation to classes and objects in a knowledge base. The vagueness measure may be inferred by performing queries against the semantic database 110 over logical statements. Intuitively, the vagueness measure indicates how much information can be inferred about the topic of a document given that the document contains the candidate key term. The vagueness measure may be embodied as a qualitative binary value (e.g., true/false), a quantitative value (e.g., a number between zero and one), or any other appropriate value. The computing device 102 may perform multiple queries against the semantic database 110 to determine multiple vagueness measures, and a composite vagueness score may be determined by averaging and/or otherwise combining the vagueness measures resulting from those queries, as described further below.

In some embodiments, in block 508 the computing device 102 may determine a vagueness measure by determining whether any concept in the semantic database 110 includes the candidate key term. Concepts in the semantic database 110 may include classes, objects, or any other "things" identified in the semantic database 110. If no concept in the semantic database 110 includes the candidate key term, then the vagueness measure for the candidate key term is relatively high (e.g., "true," the number one, or other high value). Conversely, if at least one concept in the semantic database 110 includes the candidate key term, then the vagueness measure for the candidate key term is relatively low (e.g., "false," the number zero, or other low value).

Referring now to FIG. 6, pseudocode 600 illustrates one potential embodiment of a query to determine whether the semantic database 110 includes a concept for the candidate key term. In the illustrative embodiment, the semantic database 110 is an ontological mapping of a general-knowledge encyclopedia. In particular, in the illustrative embodiment the semantic database 110 is DBpedia, which is a structured classification of the articles included in Wikipedia, the free encyclopedia. DBpedia maintains an RDF database of logical statements about the content of Wikipedia, which may be queried using the SPARQL Protocol and RDF Query Language (SPARQL) to provide insight into the content and relationships between Wikipedia articles. The illustrative pseudocode 600 includes a SPARQL query against DBpedia that returns true if any "thing" (i.e., any class or object) having an associated Wikipedia page also has a label equal to the candidate key term, which is illustratively "Battle of Hastings." The results of the illustrative query may be logically negated to produce a vagueness measure. Thus, if the illustrative query returns "true" (indicating that Wikipedia includes an article labeled "Battle of Hastings"), then the associated vagueness measure may be set to zero (i.e., not vague). Additionally or alternatively, the computing device 102 may make other queries against DBpedia, such as querying whether any articles about people, places, or organizations have labels that include the candidate key term (a named entity query). In some embodiments, the computing device 102 may make more specialized queries. For example, a user interaction may specify that the user is interested in finding actors who starred in a particular movie. In that example, the computing device 102 may form a query giving extra weight to key terms relating to actors and/or to key terms referring to actors directly related to that particular movie.

Referring back to FIG. 5, in some embodiments, in block 510 the computing device 102 may determine the vagueness measure by determining the number of concepts or types of concepts in the semantic database 110 that include the candidate key term. The number of concepts or types of concepts including the candidate key term may indicate the relative amount of vagueness. For example, a relatively high number of concepts may be interpreted as a high vagueness measure, and a relatively low (but non-zero) number of concepts may be interpreted as a low vagueness measure. As an illustration, if the semantic database 110 is embodied as DBpedia as described above, appropriate queries may include how many articles in Wikipedia have labels that include the candidate key term, how many types of articles in Wikipedia have labels that include the candidate key term, and/or how many articles in Wikipedia have body text that includes the candidate key term. The number of concepts and/or types of concepts for each candidate key term may be normalized to produce the vagueness measure. For example, the number of concepts and/or the number of types may be normalized by summing those values for all candidate key terms and then dividing each value by that sum.

In block 512, the computing device 102 determines a normalized vagueness score for each of the candidate key terms. After normalization, each of the candidate key terms has a single vagueness score, which may be embodied as a number between zero and one. The computing device 102 may use any average, weighted average, or other algorithm to normalize the vagueness measures previously determined. For example, in an illustrative embodiment, each candidate key term may be associated with five different vagueness measures produced by five different queries to the semantic database 110 (e.g., exact label, named entity, number of article labels, number of article types, and number of article bodies). In that illustrative embodiment, the vagueness score may be calculated as the average of those five vagueness measures.

In block 514, the computing device 102 adjusts the ranking of the candidate key terms using the normalized vagueness scores associated with the candidate key terms. The computing device 102 may use any average, weighted average, or other algorithm to adjust the ranking of each candidate key term. For example, the computing device 102 may recalculate a ranking score for each of the candidate key terms using Equation 1:

$$\text{new\_score}_i = \frac{\text{initial\_score}_i + (1 - \text{vagueness}_i)}{2} \quad (1)$$

As shown in Equation 1, the variable initial_score$_i$ is the normalized initial score assigned to the candidate key term i by the NLP key term extraction algorithm described above in connection with block 502. The variable vagueness$_i$ is the vagueness score assigned to the key term i as described above in connection with blocks 506, 512. The variable new_score$_i$ is the adjusted score assigned to the candidate key term i. After determining an adjusted score for each candidate key term, the computing device 102 re-ranks the candidate key terms. After re-ranking the candidate key terms, the method 500 is completed. As described above in connection with FIG. 3, the computing device 102 may select one or more of the highest-ranked candidate key terms as representative key terms for the document.

EXAMPLES

Illustrative examples of the technologies disclosed herein are provided below. An embodiment of the technologies may include any one or more, and any combination of, the examples described below.

Example 1 includes a computing device for automatic content discovery, the computing device comprising a key phrase extraction module to extract a key term from a document based on an importance value associated with the key term as determined by an automated key phrase extraction algorithm, wherein the document comprises a document selected by a user of the computing device; a content search module to perform an automated content search based on the key term to generate one or more search results; and a user interface module to present the one or more search results to the user.

Example 2 includes the subject matter of Example 1, and wherein the key phrase extraction algorithm comprises a TextRank algorithm or a named entity recognition algorithm.

Example 3 includes the subject matter of any of Examples 1 and 2, and wherein to extract the key term from the document comprises to rank a plurality of terms of the document using the automated key phrase extraction algorithm to generate a ranked list of terms; and select the key term from the ranked list of terms.

Example 4 includes the subject matter of any of Examples 1-3, and further including a document context module to determine a contextual part of the document, wherein the contextual part of the document is currently accessible by the user; wherein to extract the key term from the document comprises to extract the key term from the contextual part of the document.

Example 5 includes the subject matter of any of Examples 1-4, and wherein to determine the contextual part of the document comprises to identify a part of the document visible in an application viewport of the computing device.

Example 6 includes the subject matter of any of Examples 1-5, and wherein to determine the contextual part of the document comprises to identify a part of the document recently accessed by the user.

Example 7 includes the subject matter of any of Examples 1-6, and wherein the user interface module is further to associate each of the one or more search results with a corresponding key term of the contextual part of the document.

Example 8 includes the subject matter of any of Examples 1-7, and wherein to associate each of the one or more search results with the corresponding key term comprises to visually highlight the corresponding key term of the contextual part of the document in response to a user selection of the corresponding search result.

Example 9 includes the subject matter of any of Examples 1-8, and wherein to extract the key term from the document comprises to rank a plurality of terms of the document using the automated key phrase extraction algorithm to generate a ranked list of terms; and the computing device further comprises a vagueness ranking module to calculate a vagueness score for each term of the ranked list of terms by a query of a semantic database; re-rank the ranked list of terms based on the corresponding vagueness score of each term of the ranked list of terms to generate an adjusted ranked list of terms; and select the key term from the adjusted ranked list of terms.

Example 10 includes the subject matter of any of Examples 1-9, and wherein to calculate the vagueness score for each term of the ranked list of terms comprises to determine whether any concept of the semantic database includes the corresponding term.

Example 11 includes the subject matter of any of Examples 1-10, and wherein to determine whether any concept of the semantic database includes the term comprises to query an ontological mapping of an encyclopedia to determine whether any articles or article labels of the encyclopedia include the term.

Example 12 includes the subject matter of any of Examples 1-11, and wherein to calculate the vagueness score for each term of the ranked list of terms comprises to determine a corresponding number of concepts of the semantic database that include each term of the ranked list of terms; and normalize the corresponding number of concepts for each term of the ranked list of terms.

Example 13 includes the subject matter of any of Examples 1-12, and wherein to calculate the vagueness score for each term of the ranked list of terms comprises to determine a corresponding number of types of concepts of the semantic database that include each term of the ranked list of terms; and normalize the corresponding number of types of concepts for each term of the ranked list of terms.

Example 14 includes a computing device for key phrase extraction, the computing device comprising a key phrase extraction module to rank a plurality of terms of a document to generate a ranked list of terms based on a corresponding importance value associated with each of the terms as determined by an automated key phrase extraction algorithm; and a vagueness ranking module to calculate a vagueness score for each term of the ranked list of terms by a query of a semantic database; re-rank the ranked list of terms based on the corresponding vagueness score of each term of the ranked list of terms to generate an adjusted ranked list of terms; and select a key term from the adjusted ranked list of terms.

Example 15 includes the subject matter of Example 14, and wherein to calculate the vagueness score for each term of the ranked list of terms comprises to determine whether any concept of the semantic database includes the corresponding term.

Example 16 includes the subject matter of any of Examples 14 and 15, and wherein to determine whether any concept of the semantic database includes the term comprises to query an ontological mapping of an encyclopedia to determine whether any articles or article labels of the encyclopedia include the term.

Example 17 includes the subject matter of any of Examples 14-16, and wherein to calculate the vagueness score for each term of the ranked list of terms comprises to determine a corresponding number of concepts of the semantic database that include each term of the ranked list of terms; and normalize the corresponding number of concepts for each term of the ranked list of terms.

Example 18 includes the subject matter of any of Examples 14-17, and wherein to calculate the vagueness score for each term of the ranked list of terms comprises to determine a corresponding number of types of concepts of the semantic database that include each term of the ranked list of terms; and normalize the corresponding number of types of concepts for each term of the ranked list of terms.

Example 19 includes a method for automatic content discovery, the method comprising extracting, by a computing device, a key term from a document based on an importance value associated with the key term as determined by an automated key phrase extraction algorithm, wherein the document comprises a document selected by a user of the computing device; performing, by the computing device, an automated content search based on the key term to generate one or more search results; and presenting, by the computing device, the one or more search results to the user.

Example 20 includes the subject matter of Example 19, and wherein the key phrase extraction algorithm comprises a TextRank algorithm or a named entity recognition algorithm.

Example 21 includes the subject matter of any of Examples 19 and 20, and wherein extracting the key term from the document comprises ranking a plurality of terms of the document using the automated key phrase extraction algorithm to generate a ranked list of terms; and selecting the key term from the ranked list of terms.

Example 22 includes the subject matter of any of Examples 19-21, and further including determining, by the computing device, a contextual part of the document, wherein the contextual part of the document is currently accessible by the user; wherein extracting the key term from the document comprises extracting the key term from the contextual part of the document.

Example 23 includes the subject matter of any of Examples 19-22, and wherein determining the contextual part of the document comprises identifying a part of the document visible in an application viewport of the computing device.

Example 24 includes the subject matter of any of Examples 19-23, and wherein determining the contextual part of the document comprises identifying a part of the document recently accessed by the user.

Example 25 includes the subject matter of any of Examples 19-24, and further including associating, by the computing device, each of the one or more search results with a corresponding key term of the contextual part of the document.

Example 26 includes the subject matter of any of Examples 19-25, and wherein associating each of the one or more search results with the corresponding key term comprises visually highlighting the corresponding key term of the contextual part of the document in response to the user selecting the corresponding search result.

Example 27 includes the subject matter of any of Examples 19-26, and wherein extracting the key term from the document comprises ranking a plurality of terms of the document using the automated key phrase extraction algorithm to generate a ranked list of terms; calculating a vagueness score for each term of the ranked list of terms by querying a semantic database; re-ranking the ranked list of terms based on the corresponding vagueness score of each term of the ranked list of terms to generate an adjusted ranked list of terms; and selecting the key term from the adjusted ranked list of terms.

Example 28 includes the subject matter of any of Examples 19-27, and wherein calculating the vagueness score for each term of the ranked list of terms comprises determining whether any concept of the semantic database includes the corresponding term.

Example 29 includes the subject matter of any of Examples 19-28, and wherein determining whether any concept of the semantic database includes the term comprises querying an ontological mapping of an encyclopedia to determine whether any articles or article labels of the encyclopedia include the term.

Example 30 includes the subject matter of any of Examples 19-29, and wherein calculating the vagueness score for each term of the ranked list of terms comprises determining a corresponding number of concepts of the semantic database that include each term of the ranked list of terms; and normalizing the corresponding number of concepts for each term of the ranked list of terms.

Example 31 includes the subject matter of any of Examples 19-30, and wherein calculating the vagueness score for each term of the ranked list of terms comprises determining a corresponding number of types of concepts of the semantic database that include each term of the ranked list of terms; and normalizing the corresponding number of types of concepts for each term of the ranked list of terms.

Example 32 includes a method for key phrase extraction, the method comprising ranking, by a computing device, a plurality of terms of a document to generate a ranked list of terms based on a corresponding importance value associated with each of the terms as determined by an automated key phrase extraction algorithm; calculating, by the computing device, a vagueness score for each term of the ranked list of terms by querying a semantic database; re-ranking, by the computing device, the ranked list of terms based on the corresponding vagueness score of each term of the ranked list of terms to generate an adjusted ranked list of terms; and selecting, by the computing device, a key term from the adjusted ranked list of terms.

Example 33 includes the subject matter of Example 32, and wherein calculating the vagueness score for each term of the ranked list of terms comprises determining whether any concept of the semantic database includes the term.

Example 34 includes the subject matter of any of Examples 32 and 33, and wherein determining whether any concept of the semantic database includes the term comprises querying an ontological mapping of an encyclopedia to determine whether any articles or article labels of the encyclopedia include the corresponding term.

Example 35 includes the subject matter of any of Examples 32-34, and wherein calculating the vagueness score for each term of the ranked list of terms comprises determining a corresponding number of concepts of the semantic database that include each term of the ranked list of terms; and normalizing the corresponding number of concepts for each term of the ranked list of terms.

Example 36 includes the subject matter of any of Examples 32-35, and wherein calculating the vagueness score for each term of the ranked list of terms comprises determining a corresponding number of types of concepts of the semantic database that include each term of the ranked list of terms; and normalizing the corresponding number of types of concepts for each term of the ranked list of terms.

Example 37 includes a computing device comprising a processor; and a memory having stored therein a plurality of instructions that when executed by the processor cause the computing device to perform the method of any of Examples 19-36.

Example 38 including one or more machine readable storage media comprising a plurality of instructions stored thereon that in response to being executed result in a computing device performing the method of any of Examples 19-36.

Example 39 includes a computing device comprising means for performing the method of any of Examples 19-36.

Example 40 includes a computing device for automatic content discovery, the computing device comprising means for extracting a key term from a document based on an importance value associated with the key term as determined by an automated key phrase extraction algorithm, wherein the document comprises a document selected by a user of the computing device; means for performing an automated content search based on the key term to generate one or more search results; and means for presenting the one or more search results to the user.

Example 41 includes the subject matter of Example 40, and wherein the key phrase extraction algorithm comprises a TextRank algorithm or a named entity recognition algorithm.

Example 42 includes the subject matter of any of Examples 40 and 41, and wherein the means for extracting the key term from the document comprises means for ranking a plurality of terms of the document using the automated key phrase extraction algorithm to generate a ranked list of terms; and means for selecting the key term from the ranked list of terms.

Example 43 includes the subject matter of any of Examples 40-42, and further including means for determining a contextual part of the document, wherein the contextual part of the document is currently accessible by the user; wherein the means for extracting the key term from the document comprises means for extracting the key term from the contextual part of the document.

Example 44 includes the subject matter of any of Examples 40-43, and wherein the means for determining the contextual part of the document comprises means for identifying a part of the document visible in an application viewport of the computing device.

Example 45 includes the subject matter of any of Examples 40-44, and wherein the means for determining the contextual part of the document comprises means for identifying a part of the document recently accessed by the user.

Example 46 includes the subject matter of any of Examples 40-45, and further including means for associating each of the one or more search results with a corresponding key term of the contextual part of the document.

Example 47 includes the subject matter of any of Examples 40-46, and wherein the means for associating each of the one or more search results with the corresponding key term comprises means for visually highlighting the corresponding key term of the contextual part of the document in response to the user selecting the corresponding search result.

Example 48 includes the subject matter of any of Examples 40-47, and wherein the means for extracting the key term from the document comprises means for ranking a plurality of terms of the document using the automated key phrase extraction algorithm to generate a ranked list of terms; means for calculating a vagueness score for each term of the ranked list of terms by querying a semantic database; means for re-ranking the ranked list of terms based on the corresponding vagueness score of each term of the ranked list of terms to generate an adjusted ranked list of terms; and means for selecting the key term from the adjusted ranked list of terms.

Example 49 includes the subject matter of any of Examples 40-48, and wherein the means for calculating the vagueness score for each term of the ranked list of terms comprises means for determining whether any concept of the semantic database includes the corresponding term.

Example 50 includes the subject matter of any of Examples 40-49, and wherein the means for determining whether any concept of the semantic database includes the term comprises means for querying an ontological mapping of an encyclopedia to determine whether any articles or article labels of the encyclopedia include the term.

Example 51 includes the subject matter of any of Examples 40-50, and wherein the means for calculating the vagueness score for each term of the ranked list of terms comprises means for determining a corresponding number of concepts of the semantic database that include each term of the ranked list of terms; and means for normalizing the corresponding number of concepts for each term of the ranked list of terms.

Example 52 includes the subject matter of any of Examples 40-51, and wherein the means for calculating the vagueness score for each term of the ranked list of terms comprises means for determining a corresponding number of types of concepts of the semantic database that include each term of the ranked list of terms; and means for normalizing the corresponding number of types of concepts for each term of the ranked list of terms.

Example 53 includes a computing device for key phrase extraction, the computing device comprising means for ranking a plurality of terms of a document to generate a ranked list of terms based on a corresponding importance value associated with each of the terms as determined by an automated key phrase extraction algorithm; means for calculating a vagueness score for each term of the ranked list of terms by querying a semantic database; means for re-ranking the ranked list of terms based on the corresponding vagueness score of each term of the ranked list of terms to generate an adjusted ranked list of terms; and means for selecting a key term from the adjusted ranked list of terms.

Example 54 includes the subject matter of Example 53, and wherein the means for calculating the vagueness score for each term of the ranked list of terms comprises means for determining whether any concept of the semantic database includes the term.

Example 55 includes the subject matter of any of Examples 53 and 54, and wherein the means for determining whether any concept of the semantic database includes the term comprises means for querying an ontological mapping of an encyclopedia to determine whether any articles or article labels of the encyclopedia include the corresponding term.

Example 56 includes the subject matter of any of Examples 53-55, and wherein the means for calculating the vagueness score for each term of the ranked list of terms comprises means for determining a corresponding number of concepts of the semantic database that include each term of the ranked list of terms; and means for normalizing the corresponding number of concepts for each term of the ranked list of terms.

Example 57 includes the subject matter of any of Examples 53-56, and wherein the means for calculating the vagueness score for each term of the ranked list of terms comprises means for determining a corresponding number of types of concepts of the semantic database that include each term of the ranked list of terms; and means for normalizing the corresponding number of types of concepts for each term of the ranked list of terms.

The invention claimed is:

1. A computing device for automatic content discovery, the computing device comprising:
   a document context module to determine a contextual part of a document, wherein the contextual part of the document is currently accessible by a user of the computing device, and wherein to determine the contextual part of the document comprises to identify a part of the document visible in an application viewport of the computing device;
   a key phrase extraction module to extract a key term from the contextual part of the document based on an importance value associated with the key term as determined by an automated key phrase extraction algorithm in response to a determination of the contextual part of the document, wherein the document comprises a document selected by the user of the computing device;
   a vagueness ranking module configured to:
      (i) calculate a vagueness score for each term of a plurality of terms of the document by a query of a semantic database, wherein to calculate the vagueness score comprises to calculate an average of a plurality of vagueness measures, wherein each vagueness measure is produced by an associated query of the semantic database,
      (ii) determine a ranking score for each term as a function of the corresponding importance value and the corresponding vagueness score,
      (iii) rank each term based on the corresponding ranking score,
      (iv) re-rank the plurality of terms based on the corresponding vagueness score of each term to generate an adjusted ranked list of terms, and
      (v) select the key term from the adjusted ranked list of terms based on a rank of each term;
   a content search module to perform an automated content search based on the key term to generate one or more search results; and
   a user interface module to present the one or more search results to the user.

2. The computing device of claim 1, wherein to determine the contextual part of the document comprises to identify a part of the document recently accessed by the user.

3. The computing device of claim 1, wherein the user interface module is further to associate each of the one or more search results with a corresponding key term of the contextual part of the document.

4. The computing device of claim 1, wherein to calculate the vagueness score for each term of the ranked list of terms comprises to determine whether any concept of the semantic database includes the corresponding term.

5. The computing device of claim 4, wherein to determine whether any concept of the semantic database includes the term comprises to query an ontological mapping of an encyclopedia to determine whether any articles or article labels of the encyclopedia include the term.

6. One or more computer-readable storage media comprising a plurality of instructions that in response to being executed cause a computing device to:
   determine a contextual part of a document, wherein the contextual part of the document is currently accessible by a user of the computing device, and wherein to determine the contextual part of the document comprises to identify a part of the document visible in an application viewport of the computing device;
   extract a key term from the contextual part of the document based on an importance value associated with the key term as determined by an automated key phrase extraction algorithm in response to determining the contextual part of the document, wherein the document comprises a document selected by the user of the computing device;
   establish the computing device configured to:
      (i) calculate a vagueness score for each term of a plurality of terms of the document by a query of a semantic database, wherein to calculate the vagueness score comprises to calculate an average of a plurality of vagueness measures, wherein each vagueness measure is produced by an associated query of the semantic database;
      (ii) determine a ranking score for each term as a function of the corresponding importance value and the corresponding vagueness score;
      (iii) rank each term based on the corresponding ranking score;
      (iv) re-rank the plurality of terms based on the corresponding vagueness score of each term to generate an adjusted ranked list of terms; and
      (v) select the key term from the adjusted ranked list of terms based on ranking each term;
   perform an automated content search based on the key term to generate one or more search results; and
   present the one or more search results to the user.

7. The one or more computer-readable storage media of claim 6, further comprising a plurality of instructions that in response to being executed cause the computing device to associate each of the one or more search results with a corresponding key term of the contextual part of the document.

8. The one or more computer-readable storage media of claim 6, wherein to calculate the vagueness score for each term of the ranked list of terms comprises to determine whether any concept of the semantic database includes the corresponding term.

9. The one or more computer-readable storage media of claim 8, wherein to determine whether any concept of the semantic database includes the term comprises to query an ontological mapping of an encyclopedia to determine whether any articles or article labels of the encyclopedia include the term.

* * * * *